(12) United States Patent
Tjader

(10) Patent No.: US 8,297,882 B2
(45) Date of Patent: Oct. 30, 2012

(54) DEVICE AND METHOD TO SPLIT PIPE NEAR UTILITIES

(75) Inventor: Michael Tjader, New Richmond, WI (US)

(73) Assignee: TT Technologie, Inc., Aurora, IL (US)

( * ) Notice: Subject to any disclaimer, the term of this patent is extended or adjusted under 35 U.S.C. 154(b) by 338 days.

(21) Appl. No.: 12/465,011

(22) Filed: May 13, 2009

(65) Prior Publication Data

US 2009/0285635 A1 Nov. 19, 2009

Related U.S. Application Data

(60) Provisional application No. 61/127,606, filed on May 14, 2008.

(51) Int. Cl.
*F16L 55/26* (2006.01)

(52) U.S. Cl. ........ 405/184.3; 30/92.5

(58) Field of Classification Search ...... 405/184.1, 405/184.2, 184.3; 30/92, 92.5, 103, 105
See application file for complete search history.

(56) References Cited

U.S. PATENT DOCUMENTS

| | | | | |
|---|---|---|---|---|
| 3,654,027 | A * | 4/1972 | Middleton | 156/438 |
| 4,437,799 | A * | 3/1984 | Liu et al. | 406/198 |
| 6,149,346 | A | 11/2000 | Takamatsu et al. | |
| 6,848,541 | B2 * | 2/2005 | Griffioen et al. | 184/15.2 |
| 2002/0114671 | A1 | 8/2002 | Wentworth et al. | |
| 2004/0228691 | A1 * | 11/2004 | Tjader | 405/184.3 |
| 2005/0262698 | A1 * | 12/2005 | Tjader | 30/92.5 |
| 2007/0036613 | A1 * | 2/2007 | Tjader | 405/184.3 |
| 2007/0048091 | A1 * | 3/2007 | Tjader | 405/184.3 |
| 2008/0008537 | A1 * | 1/2008 | Tjader | 405/184.3 |
| 2009/0175689 | A1 * | 7/2009 | Tjader | 405/184.3 |

FOREIGN PATENT DOCUMENTS

| | | |
|---|---|---|
| DE | 1525881 C3 | 3/1976 |
| DE | 10259111 B3 | 2/2004 |
| EP | 0872679 B1 | 12/2001 |
| GB | 2389401 A | 12/2003 |
| GB | 2440626 A | 2/2008 |
| GB | 2440627 A | 2/2008 |
| WO | WO-2005014967 A1 | 2/2005 |

OTHER PUBLICATIONS

"British Application Serial No. GB0908047, Office Action mailed Aug. 25, 2009", 4 pgs.
"German Application Serial No. 102009021389.9, Office Action mailed Sep. 21, 2010", 2 pgs.

* cited by examiner

*Primary Examiner* — Tara Mayo-Pinnock
(74) *Attorney, Agent, or Firm* — Schwegman Lundberg & Woessner, P.A.

(57) ABSTRACT

Examples of splitter systems and methods are shown. In some examples, a splitter system includes a splitter body. A plurality of blades is attached at different angular locations around a perimeter of the splitter body. In some examples, the plurality of blades have a cutting depth that is less than a thickness of a wall thickness of a pipe to be split. Configurations are further shown that provide lubrication to splitting operations in a number of locations along a splitter system. Configurations are also shown that provide electrical isolation to cutting blades.

21 Claims, 5 Drawing Sheets

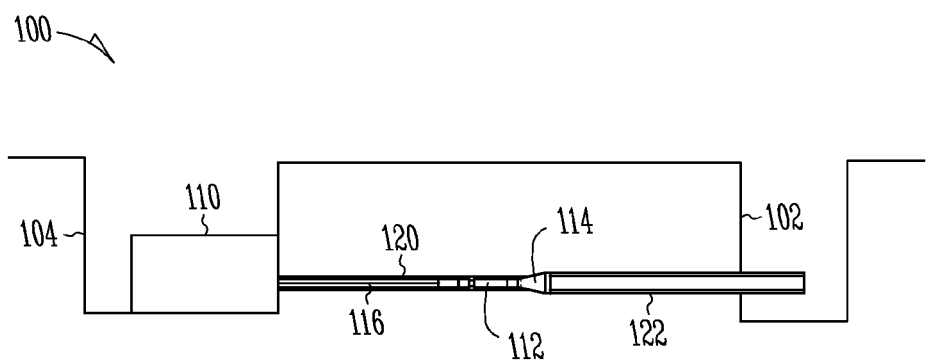
Fig. 1
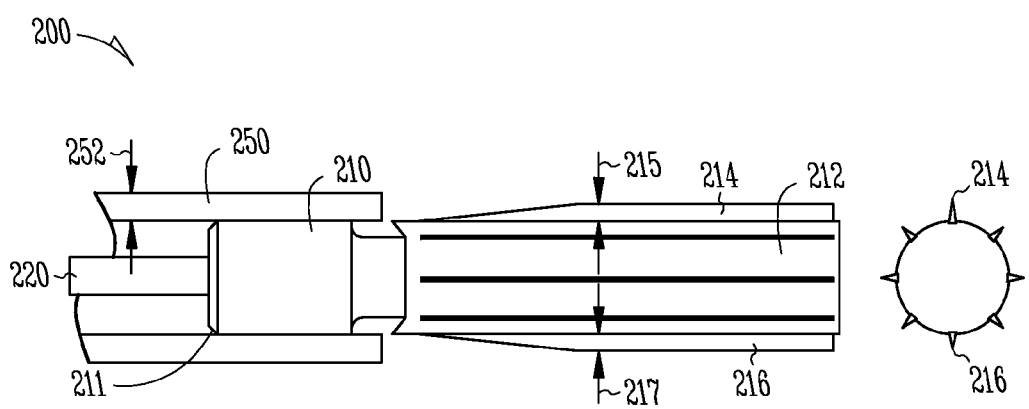
Fig. 2A
Fig. 2B

DEVICE AND METHOD TO SPLIT PIPE NEAR UTILITIES

RELATED APPLICATIONS

This patent application claims the benefit of priority, under 35 U.S.C. Section 119(e), to U.S. Provisional Patent Application Ser. No. 61/127,606, filed on May 14, 2008, which is incorporated herein by reference in its entirety.

BACKGROUND

Pipe splitting is useful for replacement of pipes without the need to excavate the length of the pipe to be replaced. An example of pipe splitting includes pulling a cutting blade with an expander through the pipe to be replaced, and attaching a new pipe behind the cutting blade. The pipe to be replaced is split, and pushed into the surrounding soil, and the new pipe, of equal or larger diameter is pulled into the new space within the split pipe. Splitter are commonly used for small diameter pipes, and for pipes of a material that lends itself to splitting.

Gas lines are one example of pipes where splitting is useful in pipe replacement. An example includes high density polyethylene (HDPE) gas pipe. Large quantities of 2 inch diameter HDPE gas pipes are currently in need of replacement. 300 miles of gas pipe in a single city in need of replacement is not uncommon. Improved splitter systems are needed to address the large task of replacing old pipes such as HDPE gas lines and other pipe materials/utilities in need of replacement.

BRIEF DESCRIPTION OF THE DRAWINGS

FIG. 1 shows a splitting system in operation according to an embodiment of the invention.

FIG. 2A shows a side view of a portion of a splitting system and a portion of pipe according to an embodiment of the invention.

FIG. 2B shows an end view of FIG. 2A.

DETAILED DESCRIPTION

Figure 3:
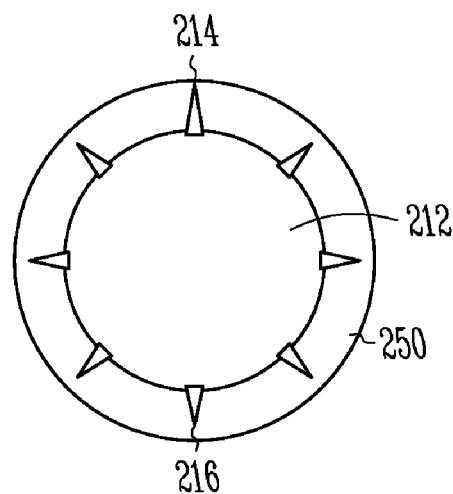
FIG. 3 shows an end view of a portion of a splitting system and a portion of pipe according to an embodiment of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. In the following description, the term cable is defined to include metal cables, wire rope, or other lengths of flexible line of suitable strength to pull devices as described below through a section of pipe. These embodiments are described in sufficient detail to enable those skilled in the art to practice the invention. Other embodiments may be utilized and mechanical, structural, or logical changes, etc. may be made without departing from the scope of the present invention.

FIG. 1 shows a splitter system 100 in operation performing a split and replacement. An entry pit 102 and an exit pit 104 are shown, with a pipe 120 that is to be replaced by the splitting operation. A pulling system is shown with a puller 110 illustrated in block diagram form. A pulling member 116 is shown coupled to the puller 110 and to a splitter 112. In operation, the puller 110 engages and advances the pulling member 116 to move the splitter 112 from the entry pit 102 to the exit pit 104. An expander 114 is also shown coupled to the splitter 112. The expander expands the pipe 120 after the splitter 112 weakens the pipe 120 as will be described in more detail below. A new pipe 122 is also shown coupled to the expander. In one embodiment, the new pipe 122 is pulled into the cavity formed by the expander as the splitter 112 and expander 114 combination is pulled.

A number of puller 110 and pulling member 116 options are possible. In one example, the pulling member included a number of pulling rods that are joined together in sections, and the puller includes a rod puller. One example of a rod puller engages the rods in a number of notches or openings in the rods (not shown). In one embodiment, the rods are first pushed through the pipe to be replaced, then the splitter system is coupled to the rods and the splitter system is drawn back through the pipe, as described above. In one embodiment, a leading portion with a swivel joint such as a ball joint is attached to a front end of the rods prior to pushing the rods through the pipe to be replaced. A short leading portion, such as an approximately six inch long portion with an rounded nose, provides improved tracking of the rods within the pipe to be replaced. Improved tracking helps prevent the rods from accidentally pushing through a wall of the pipe to be replaced.

Other examples of a puller 110 and pulling member 116 includes a cable, wire rope, etc. pulling member 116 that is pulled by a winch, cyclic cable puller, or other cable puling device. Other pullers 110 and pulling members 116 are also possible, such as directional drill stem sections, etc.

In addition to pulling options, in one embodiment, a number of rods are used to push an embodiment of a splitter system. In one example, after the splitter system is pushed through the pipe to be replaced, at least portions of the splitter system are removed, and the new pipe is attached to an expander and pulled back by the same rod puller/pusher.

FIG. 2A shows a splitter system 200 that is used in one example of the splitting operation shown in FIG. 1. A shaping mandrel 210 is shown coupled to a splitter body 212. A pulling member 220 such as rods, cables, etc. as described above is also shown. The shaping mandrel 210 is shown partially within a pipe 250. The pipe is shown with a wall thickness 252. In one example of pipe splitting, a polymeric pipe such as HDPE pipe is split. One example includes 2 inch outer diameter HDPE gas line splitting. One of ordinary skill in the art having the benefit of the present disclosure will recognize that other pipe materials such as other polymers, copper, other metals capable of being split, etc. are within the scope of the invention.

Using HDPE gas line splitting as an example, it has been found, that old pipes are sometimes distorted in an out of round shape, however, the wall thickness is quite consistent. In one example, pulling the shaping mandrel 210 through the pipe 250 before splitting forms the pipe 250 into a predictable configuration prior to a splitting operation. Although a round cross section pipe 250 is used as an example, other shapes and corresponding shaping mandrels 210 are within the scope of the invention. FIG. 2A also illustrates a leading feature 211 such as a taper or similar configuration to aid in pulling the shaping mandrel 210 into the pipe 250.

One problem to be overcome in splitting pipes is that frequently there are adjacent utilities buried in close proximity to the pipe to be split. Some adjacent utilities are fragile, such as fiber optic cables. Other adjacent utilities are dangerous such as electrical lines. It is desirable to perform a splitting operation on pipes 250 with minimal impact and minimal danger to a splitting operator. A device and method are needed to reduce damage to adjacent utilities.

FIG. 2A shows a plurality of blades 216 attached to an external surface of the splitter body 212. The end view of FIG. 2B shows the plurality of blades 216 located at a number of different angular locations around the surface of the splitter body 210. The blades 216 are shown with a cutting depth 217 that is less than the wall thickness 252 of the pipe 250. When the blades 216 are pulled through the pipe 250, they will therefore not penetrate a surface of the pipe 250. This configuration ensures that the blades 216 will not contact any adjacent utility lines. This configuration is most effective when there is a consistent wall thickness 252 of the pipe 250. One application with very consistent wall thickness 252 includes HDPE gas line replacement.

In one example, a primary blade 214 is included with the plurality of blades 214. The primary blade 214 is shown with a primary cutting depth 215. In one example the primary cutting depth 215 is deeper than the cutting depth 217 of the other blades 216. Using a primary blade 214 provides a more consistent fracture line for the pipe 250 during a splitting operation. In one example the cutting depth 217 of the blades is set at approximately 75 percent of the wall thickness 252. In one example the primary cutting depth 215 is set at approximately 90 percent of the wall thickness. Although eight blades 216, including one primary blade 214 are shown, the invention is not so limited. Other numbers of blades and primary blades are possible without departing from the scope of the invention. Although regular angular blade spacing of 45 degrees apart is shown, other embodiments include different blade spacings.

Figure 4:
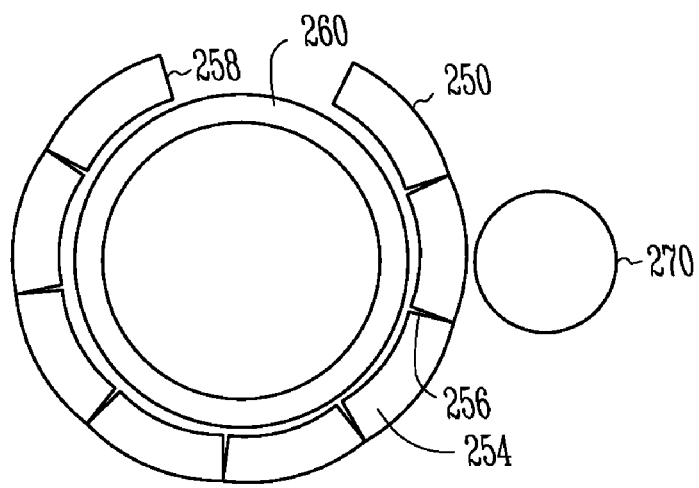
FIG. 4 shows a split pipe and a new pipe and an adjacent utility line according to an embodiment of the invention.

FIG. 3 shows an end view of the splitter body 212 and the blades 216 engaging the pipe 250. As can be seen from the figure, the primary blade 214 is cutting a deeper score in the pipe 250, but is still not penetrating a surface of the pipe 250, thus ensuring no damage to an adjacent utility. FIG. 4 illustrates the pipe 250 further after a splitting operation. The pipe 250 shows a number of sections 254 defined by a number of scores 256 such as a 75 percent wall thickness score, or other suitable depth. The pipe 250 in FIG. 4 also shows a break 258 that corresponds to the location of the primary blade 214. A new pipe 260 is shown pulled into the cavity formed after the splitting operation. An adjacent utility line 270 is shown to illustrate the safety in splitting with blades having a cutting depth less than a wall thickness of the pipe 250.

One problem with splitting pipe such as HDPE gas lines is that the split pipes can have a detrimental shape memory. After splitting with a single blade, the pipe 250 can curl up and tighten about the new pipe 260. This causes increased friction when pulling the new pipe 260 into the split pipe 250. By cutting the pipe 250 into a number of sections 254, any shape memory of the pipe 250 is relaxed, and the new pipe 260 can be pulled into the cavity formed more easily. Additionally, by keeping the sections 254 loosely attached at the scores 256, the pipe 250 is weakened, but still retains some axial integrity. This can help prevent the pipe 250 from bunching up into a number of fractured strands during a splitting operation. An advantage of using a primary blade 214 includes formation of a predictable break line 258.

Figure 5:
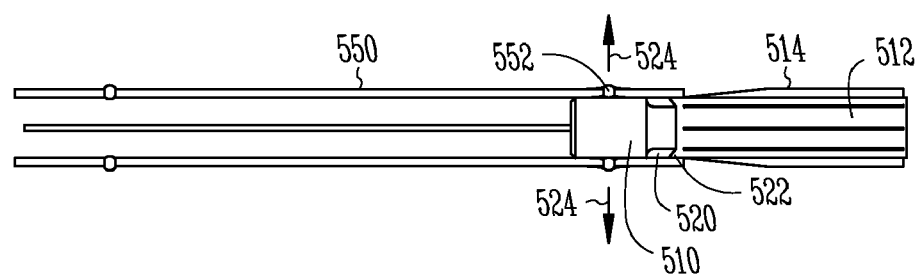
FIG. 5 shows a side view of a portion of a splitting system according to an embodiment of the invention.

FIG. 5 illustrates further aspects of one embodiment of a splitter system 500 in operation performing a split and replacement. When polymer pipe such as HDPE gas pipe is installed, it is often fused in sections using some form of heat source. Each fusion joint tends to form a bead 552, which often protrudes into an interior of the pipe 250 as shown in the figure.

In one embodiment, the bead 552 rides up over a shaping mandrel 510 similar to other embodiments described above. The bead 552 is shown in FIG. 5 being forced outward over the shaping mandrel 510 along arrows 524. As shown in FIG. 5, a splitter body 512 and a number of blades 514 are coupled behind the shaping mandrel 510. In one embodiment an interior portion of the bead 552 is removed from the pipe 550 prior to splitting on the blades 514. A cutting blade 522 is shown adjacent to a cavity 520 as one example of a device to remove a portion of the bead 552.

Figure 6:
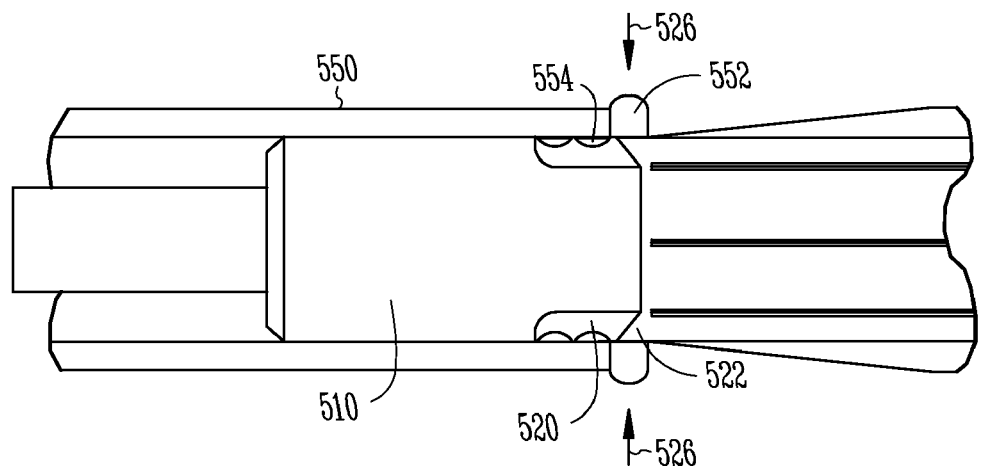
FIG. 6 shows a close up view of a portion of a splitting system according to an embodiment of the invention.

In FIG. 6, the bead 552 is shown after it passes over the shaping mandrel 510 and an interior portion 554 is sheared off the bead 552 by the cutting blade 522. In one example a cavity 520 is included as illustrated. In one example, the cavity 520 is sized and shaped to accommodate multiple sheared portions 554 of beads 552. Removal of interior portions of beads 552 contributes to a consistent cutting depth of the blades 514 in the wall thickness of the pipe 550 as described in embodiments above.

Figure 7:
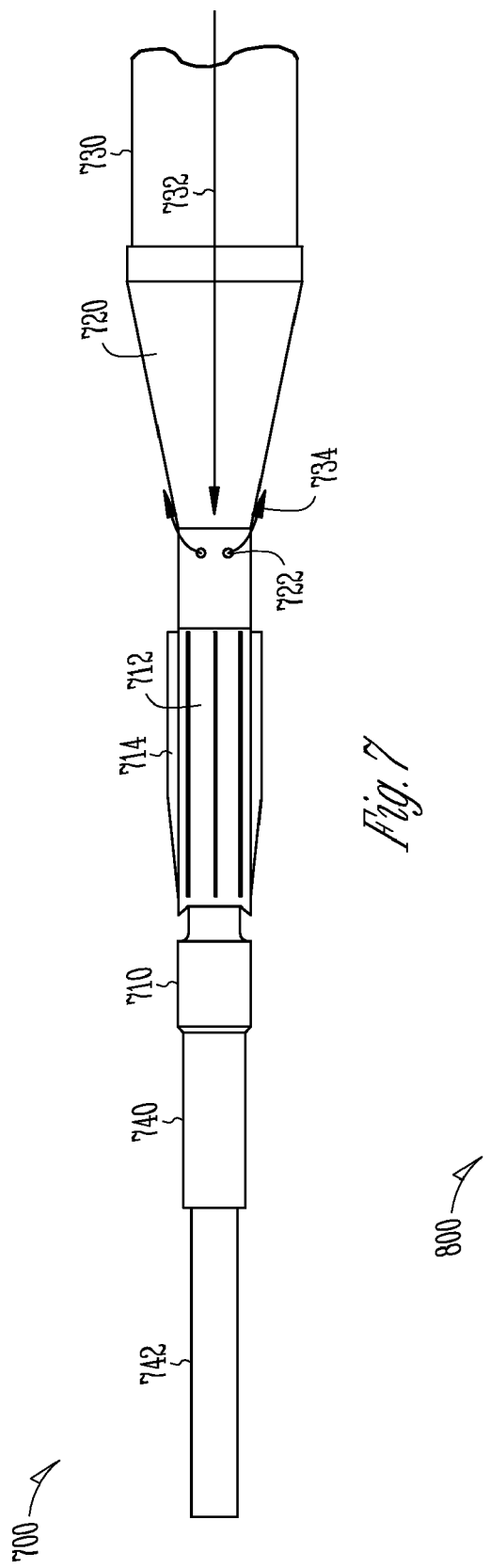
FIG. 7 shows a side view of a portion of another splitting system according to an embodiment of the invention.

FIG. 7 illustrates further aspects of one embodiment of a splitter system 700 in operation performing a split and replacement. Similar to embodiments described above, a shaping mandrel 710 is shown attached to a splitter body 712, having a number of blades 714. As in other embodiments, the blades are formed with a cutting depth that is less than a wall thickness of a pipe to be cut (not shown in FIG. 7). A pulling member 742 such as a pulling rod, cable, directional drill stem, etc. is shown coupled to a front end of the splitter system 700.

In one embodiment, a non-conductive insert 740 is coupled between the shaping mandrel 710 and the pulling member 742. When splitting an insulating material such as HDPE, if an adjacent electrical line were breached and came into contact with metal cutting blades, electricity could travel down the pulling member 742 towards a pulling device such as a winch, rod puller, etc. By inserting a non-conductive insert 740 between the splitter body 712 and the pulling member 742, a potential for electrical shock is reduced. In one example, a non-conductive insert 740 includes a fiberglass insert. Other non-conductive inserts 740 of sufficient strength and toughness are also possible.

FIG. 7 further illustrates an expander 720 coupled behind the splitter body 712. A new pipe 730 is shown being pulled in behind the splitter system 700. In one embodiment, a fluid is pumped into the new pipe 730 as shown along lines 732 and the fluid is expelled in front of the expander 720. One or more ports 722 are shown on the expander in FIG. 7 to expel fluid as shown by arrows 734. Examples of fluids include water, slurries of clay and water, or other suitable fluids. In other embodiments, the fluid is pumped through a supply hose (not shown) that is pulled within the new pipe 730. Using a supply hose eliminates contamination of the inside of the new pipe 730 with residue from the fluid.

In one method of pipe installation, the new pipe 730 is used as a liner, and a replacement line such as a gas line is further introduced within the new pipe 730 for service. Using such a pipe within a pipe configuration, there are no contamination issues from pumping a fluid directly by flooding an interior of the new pipe 730.

Figure 8:
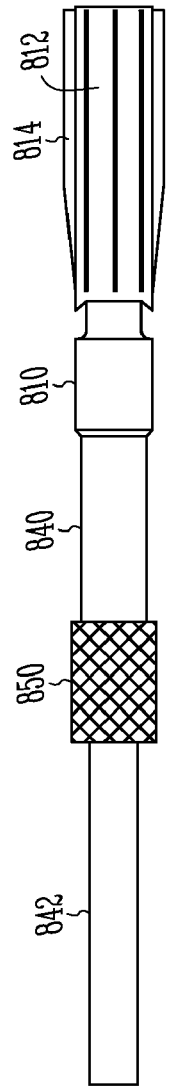
FIG. 8 shows a side view of a portion of another splitting system according to an embodiment of the invention.

FIG. 8 illustrates further aspects of one embodiment of a splitter system 800 in operation performing a split and replacement. Similar to embodiments described above, a shaping mandrel 810 is shown attached to a splitter body 812, having a number of blades 814. As in other embodiments, the blades are formed with a cutting depth that is less than a wall thickness of a pipe to be cut (not shown in FIG. 8). In one embodiment, the splitter system 800 includes a non-conductive insert 840 between the shaping mandrel 810 and a pulling member 842.

In addition, the embodiment of FIG. 8 illustrates a lubricant dispenser 850 located in front of the shaping mandrel 810. In a further effort to reduce friction in the system, the lubricant dispenser helps the shaping mandrel 810 and other following components to slide within the pipe to be replaced. One example of a simple and effective lubricant dispenser includes a sponge soaked in lubricant, located in advance of the shaping mandrel 810 and other components. A number of advanced lubricants are available that could be soaked into a sponge or similar lubricant retaining material and refilled or otherwise recharged before a new splitting operation. Other lubricant dispensers such as a fluid reservoir and ports, or a supply through a line from an external source are also possible.

Figure 9:
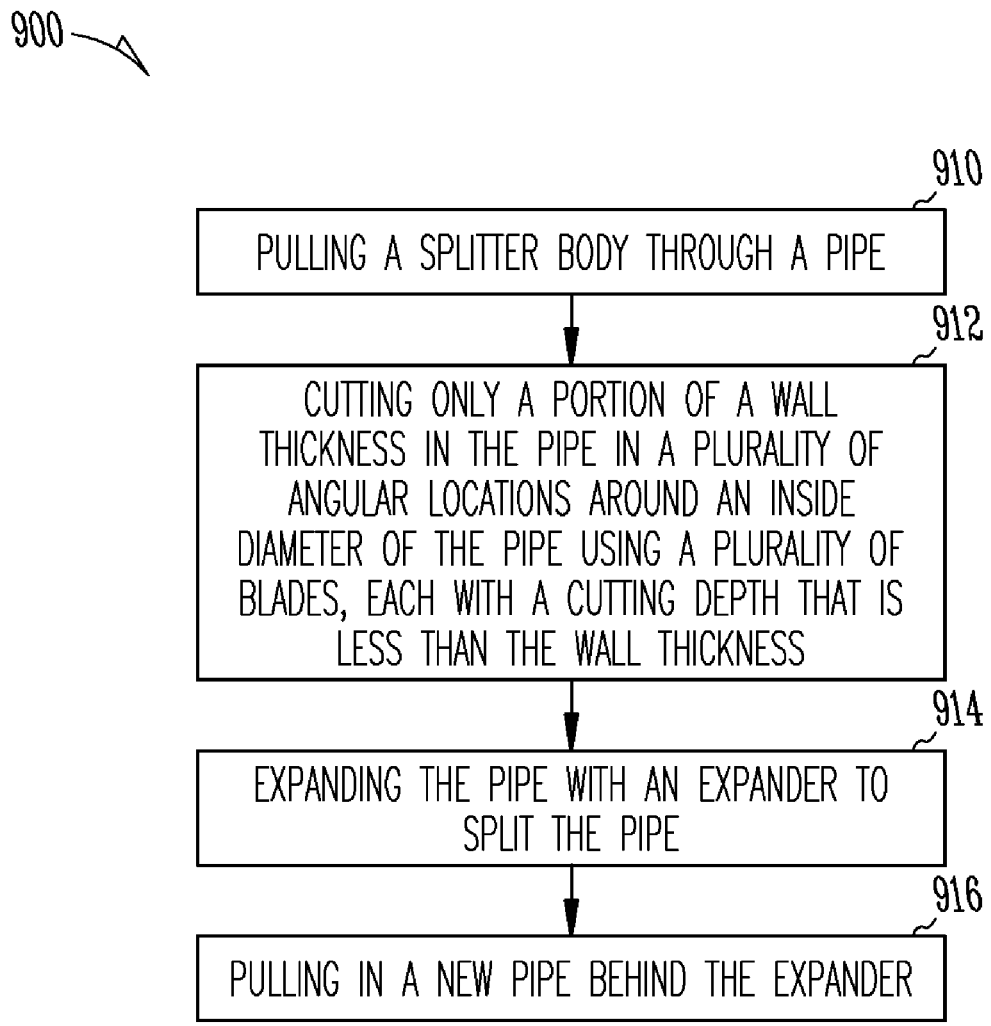
FIG. 9 shows a flow chart of an example method according to an embodiment of the invention.

FIG. 9 shows an example flow diagram of a method of splitting a pipe using one or more device configurations as described above. In operation 910, a splitter body is pulled through a pipe. In operation 912, a portion of a wall thickness in the pipe is cut in a plurality of angular locations around an inside diameter of the pipe using a plurality of blades, each with a cutting depth that is less than the wall thickness of the pipe. Operations 914 and 916 illustrate expanding the pipe, and pulling in a new pipe behind the expander.

As described above, in one embodiment, a shape memory of the split pipe is relieved by multiple interior scores using such as configuration, and friction on any new pipe being pulled in is reduced. By cutting only a portion of the wall thickness, adjacent utilities such as fragile fiber optics, or electrical lines are protected.

While a number of advantages of embodiments of the invention are described, any lists of above mentioned advantages are not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and methods are used. The scope of the invention should be determined with reference to the appended claims, along with the full scope of equivalents to which such claims are entitled.

I claim:

1. A splitter system, comprising:
a pipe to be split, having a wall thickness;
a splitter body;
a plurality of blades attached at different angular locations around a perimeter of the splitter body;
wherein each of the plurality of blades has a maximum cutting depth that is less than the wall thickness of the pipe to be split.

2. The splitter system of claim 1, wherein the cutting depth is approximately 75 percent of the wall thickness of the pipe to be split.

3. The splitter system of claim 2, wherein a primary blade is included in the plurality of blades, the primary blade having a primary cutting depth that is deeper than the rest of the plurality of blades.

4. The splitter system of claim 3, wherein the primary cutting depth is approximately 90 percent of the wall thickness of the pipe to be split.

5. The splitter system of claim 1, further including an expander coupled behind the splitter body, wherein the expander includes at least one opening to expel a fluid.

6. The splitter system of claim 5, wherein the fluid is introduced to the expander through a new pipe that is pulled in behind the expander.

7. The splitter system of claim 1, further including a shaping mandrel coupled to a front portion of the splitter body to re-form the pipe to be split into a round cross section prior to splitting.

8. The splitter system of claim 7, further including a lubricant dispenser located in front of the shaping mandrel.

9. The splitter system of claim 1, further including a bead cutter located in front of the plurality of blades, wherein the bead cutter includes a blade to cut off a portion of a bead from a seam in the pipe prior to splitting.

10. The splitter system of claim 1, further including a non-conductive insert coupled at a front portion of the splitter system to electrically isolate the splitter system from a pulling system.

11. The splitter system of claim 10, wherein the pulling system includes a number of interlocking rods.

12. The splitter system of claim 10, wherein the pulling system includes a cable.

13. A method, comprising:
pulling a splitter body through a pipe;
cutting only a portion of a wall thickness in the pipe in a plurality of angular locations around an inside diameter of the pipe using a plurality of blades, each with a maximum cutting depth that is less than the wall thickness of the pipe; and
expanding the pipe with an expander to split the pipe;
pulling in a new pipe behind the expander.

14. The method of claim 13, further including pumping a fluid into the new pipe, and expelling the fluid from one or more ports in the expander to lubricate the expander.

15. The method of claim 13, further including cutting off an inner diameter portion of a bead in the pipe prior to cutting the portion of the wall thickness.

16. The method of claim 13, further including pulling a shaping mandrel in front of the splitter body to form a consistent pipe shape prior to cutting the portion of the wall thickness.

17. The method of claim 16, further including providing a lubricant to the shaping mandrel during pulling.

18. The method of claim 16, further including electrically isolating the splitter body from a pulling system using a non-conductive insert.

19. A splitter system, comprising:
a pipe to be split, having a wall thickness;
a splitter body;
a plurality of blades attached at different angular locations around a perimeter of the splitter body;
wherein the plurality of blades includes a primary blade, the primary blade including a maximum primary cutting depth that is deeper than a maximum cutting depth of each of the rest of the plurality of blades, wherein the maximum primary cutting depth and the maximum cutting depth of each of the rest of the plurality of blades are each less than the wall thickness of the pipe to be split.

20. The splitter system of claim 19, wherein the cutting depth is approximately 75 percent of the wall thickness of the pipe to be split.

21. The splitter system of claim 20, wherein the primary cutting depth is approximately 90 percent of the wall thickness of the pipe to be split.

* * * * *